(12) United States Patent
Wisniewski et al.

(10) Patent No.: US 8,567,815 B2
(45) Date of Patent: Oct. 29, 2013

(54) LIMITING ENERGY LEAKAGE DURING LASER SCORING OF VEHICLE AIRBAG COVERINGS

(75) Inventors: Aaron Wisniewski, Plymouth, MI (US); Mathew Barr, Clarkston, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 162 days.

(21) Appl. No.: 13/227,621

(22) Filed: Sep. 8, 2011

(65) Prior Publication Data

US 2013/0065041 A1     Mar. 14, 2013

(51) Int. Cl.
    *B60R 21/20*      (2011.01)
(52) U.S. Cl.
    USPC ..................................................... 280/728.3
(58) Field of Classification Search
    USPC ........................................ 280/728.3; 264/400
    See application file for complete search history.

(56) References Cited

FOREIGN PATENT DOCUMENTS

JP      2008110647 A    *    5/2008

* cited by examiner

*Primary Examiner* — Faye M. Fleming
(74) *Attorney, Agent, or Firm* — Reising Ethington P.C.

(57) ABSTRACT

A covering for use over a vehicle airbag includes a skin layer and an attached foam layer. The foam layer is constructed from a polymer-based material that includes a polymer portion and an additive, and the additive may be selected to affect the energy transmission characteristics of the foam layer material when the covering is subjected to a laser scoring process that uses a laser light beam having a characteristic wavelength. The additive may decrease the amount of light energy transmitted through the material at the characteristic wavelength to limit the amount of energy leakage from one cut location to another during laser scoring. The decrease in light transmission through the material may be accompanied by an increase in the light absorption of the material, an increase in the amount of light reflected by the material, and/or an increase in a laser cutting rate of the material per unit energy.

17 Claims, 2 Drawing Sheets

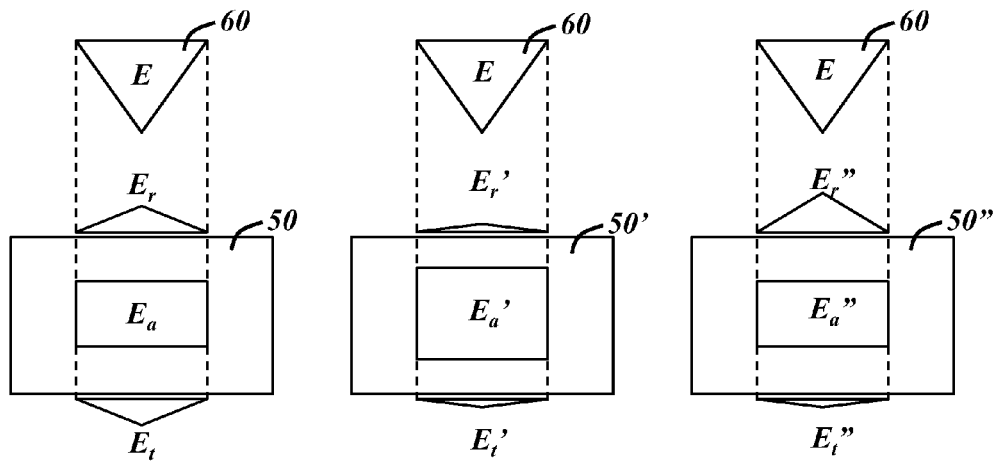
*FIG. 4*    *FIG. 5*    *FIG. 6*
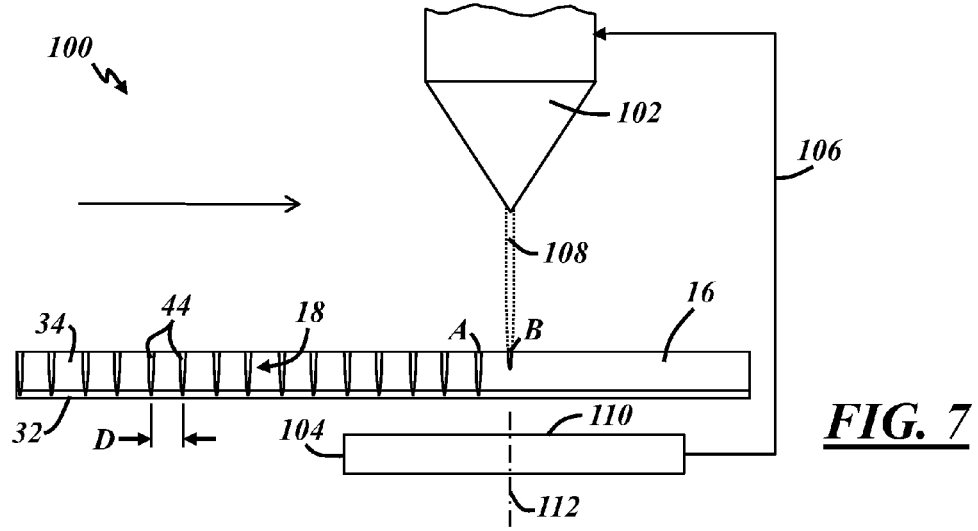
*FIG. 7*
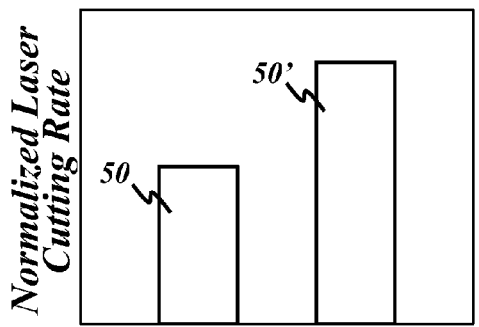
*FIG. 8*
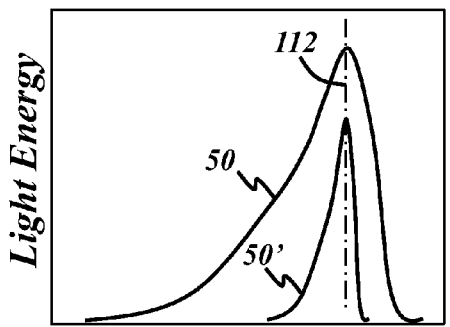
*FIG. 9*

LIMITING ENERGY LEAKAGE DURING LASER SCORING OF VEHICLE AIRBAG COVERINGS

TECHNICAL FIELD

The present disclosure relates generally to coverings for use over vehicle airbags and, more particularly, to coverings having tear seams formed by laser scoring.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partially define the pre-determined location of the opening. Such panels may include decorative coverings disposed over a substrate to achieve a desired aesthetic in the vehicle interior. These types of decorative coverings can include an outer skin layer and one or more optional underlying layers of material designed to provide a particular look or feel.

Great Britain U.S. Pat. No. 1,343,974 describes a multi-layer material that may be used for decorative purposes. In particular, it describes various ways to simulate a wood grain pattern, a gold leaf pattern, or a marble pattern. One method includes providing an outer transparent film layer having a grain, gold leaf, or marble pattern applied thereon and forming a layer of material on a backside of the film that contrasts in color with the pattern to make the pattern visible when viewed from the front side. The contrasting color can be provided as a second transparent film layer on the backside of the outer layer or as a pigmented foam material. This faux-graining technique is disclosed for use in the furniture industry using high density foams that simulate the density of wood and was developed in an attempt to limit the need to hand carve wood to a desired shape by allowing molding of such shapes using synthetic materials.

SUMMARY

In accordance with one embodiment, a method of forming a tear seam in an airbag covering is provided. The method includes the steps of: (a) providing an airbag covering including a skin layer and a foam layer, the layers having surfaces in facial contact with each other; (b) directing a laser light beam from a laser light source toward the covering such that the foam layer is located between the light source and the skin layer; (c) successively forming a plurality of laser cuts in the covering at a plurality of spaced apart locations along a pre-determined cutting pattern that corresponds to a desired tear seam location; and (d) limiting the amount of energy leakage from the location of each successive laser cut to the location of the previously formed laser cut while forming each successive laser cut by providing an additive in the foam layer that affects the energy transmission characteristics of the foam layer.

In one embodiment, the method may further comprise the step of providing the foam layer such that it is constructed from a foam layer material that includes a polymer portion having a natural color associated with the polymer portion, and the step of providing the additive in the form of a colorant dispersed in the polymer portion of the material in an amount that causes the color of the foam layer material to be different from the natural color.

In another embodiment, the method may further comprise the step of providing the foam layer such that it is constructed from a foam layer material comprising a polymer-based foam and the additive, and the step of selecting the additive such that less light is transmitted through the foam layer material than through the polymer-based foam at a characteristic wavelength of the laser light beam.

In another embodiment, the method may include selecting the additive such that more light is absorbed by the foam layer material than by the polymer-based foam at the characteristic wavelength.

In yet another embodiment, the method may include selecting the additive such that more light is reflected by the foam layer material than by the polymer-based foam at the characteristic wavelength.

In still another embodiment, the method may include selecting the additive such that the depth of each laser cut per unit energy of light is higher for the foam layer material than for the polymer-based foam.

In another embodiment, the method may further comprise the step of disposing the covering over a substrate so that the foam layer is between the substrate and the skin layer before directing the laser light beam from the laser light source toward the covering such that the foam layer is located between the light source and the skin layer.

In another embodiment, the method may be performed such that the distance between at least some of the laser cut locations along the cutting pattern is about 3.0 mm or less.

In yet another embodiment, the method may include limiting a width of the distribution of light transmitted through the covering at the characteristic wavelength and toward a laser scoring system sensor by providing the additive.

In accordance with another embodiment, an airbag covering for use in a tear seam forming process that uses a laser light beam having a characteristic wavelength is provided. The airbag covering includes a skin layer having a decorative outer surface and an opposite inner surface and a foam layer bonded to the inner surface of the skin layer. The foam layer may be formed from a foam layer material that includes a polymer-based foam and an additive dispersed within the foam layer material. The additive is present in an amount that decreases the transmission of light through the foam layer material at the characteristic wavelength when compared to the polymer-based foam.

In one embodiment, the additive may include carbon black or other colorant.

In another embodiment, the additive may be present in an amount that decreases the transmission of the characteristic wavelength of light through the foam layer material and increases the absorption of the characteristic wavelength of light by the foam layer material when compared to the polymer-based foam.

In another embodiment, the additive may be present in an amount that decreases the transmission of the characteristic wavelength of light through the foam layer material and increases the reflection of the characteristic wavelength of light by the foam layer material when compared to the polymer-based foam.

In another embodiment, the additive may be present in an amount that decreases the transmission of the characteristic wavelength of light through the foam layer material and increases a cutting rate of the foam layer material when compared to the polymer-based foam, the cutting rate being the depth of a laser cut per unit of laser light energy applied to the material.

In accordance with another embodiment, an instrument panel is provided that includes an airbag covering disposed over a substrate so that the foam layer is interposed between the substrate and the skin layer, the covering further comprising a tear seam that at least partially defines an airbag deployment opening when an airbag located under the substrate deploys. The airbag covering includes a skin layer having a decorative outer surface and an opposite inner surface and a foam layer bonded to the inner surface of the skin layer. The foam layer may be formed from a foam layer material that includes a polymer-based foam and an additive dispersed within the foam layer material. The additive is present in an amount that decreases the transmission of light through the foam layer material at the characteristic wavelength when compared to the polymer-based foam.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein:

FIG. 4 is a schematic representation of light energy being directed at a polymer-based foam;

FIG. 5 is a schematic representation of light energy being directed at a foam layer material according to one embodiment that includes a light-absorbing additive;

FIG. 6 is a schematic representation of light energy being directed at a foam layer material according to another embodiment that includes a light-reflecting additive;

FIG. 7 is a schematic representation of a laser scoring system according to one embodiment;

FIG. 8 is a chart showing laser cutting rates for a polymer-based foam and a foam layer material, according to one embodiment; and FIG. 9 is a chart showing theoretical light distributions transmitted through a polymer-based foam and a foam layer material, according to one embodiment.

DETAILED DESCRIPTION OF THE PREFERRED EMBODIMENT(S)

As will be apparent from the following disclosure, airbag coverings may be constructed with at least one layer of material that is selected at least in part for its light transmission properties at a characteristic wavelength. In particular, a foam layer with certain light transmission properties may be selected for use in an airbag covering to advantageously affect a laser scoring process as outlined below. It is noted that the appended drawings are not necessarily to scale and that any cross-hatching shown is provided for clarity in distinguishing among different components and is not meant to limit the types of materials that may be used for each component.

Figure 1:
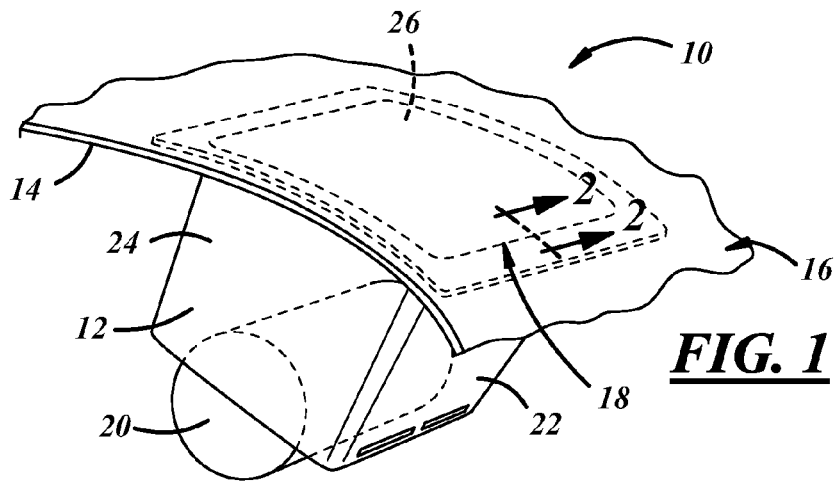
FIG. 1 is a cutaway view of an instrument panel with a non-visible tear seam arranged over an airbag module, according to one embodiment.

Referring to FIG. 1, a cut-away view of an exemplary vehicle instrument panel 10 is shown with an airbag module 12 installed therebeneath. Instrument panel 10 includes one or more layers of materials, and each layer may include its own separately weakened portion or tear seam for the formation of airbag deployment openings in each layer that may together form a deployment opening through the overall panel 10. The portion of instrument panel 10 shown in the figure is a passenger side of the instrument panel 10 and includes substrate 14, covering 16, and tear seam 18. Tear seam 18 is a non-visible tear seam in this example. The particular tear seam 18 shown is generally rectangular and located to correspond with underlying airbag module components. The tear seam may assume other known shapes, such as a U-shape, H-shape, or X-shape, to name a few examples. A vehicle passenger side airbag is used only as an example of one type of airbag that may benefit from the following disclosure, and any type of panel for use over a vehicle airbag can be used in accordance with these teachings.

Airbag module 12 is any component or device that includes an airbag arranged to deploy into the cabin of a vehicle when inflated. In this embodiment, airbag module 12 includes an airbag canister 20 and a housing 22. An airbag deploys from canister 20 toward panel 10 and the vehicle interior when necessary. The housing 22 supports the airbag canister 20 beneath instrument panel 10 and may include a chute 24 that helps to guide the airbag during deployment. This is only one version of an airbag module, while other modules may not include a canister or a separate housing and may include other types of components to compliment the functionality of the airbag. In the particular embodiments shown in FIGS. 1-3, an airbag door 26 is formed from the portion of substrate 14 lying inboard of the tear seam 18 during airbag deployment when the tear seam functions to form the deployment opening.

Figure 2:
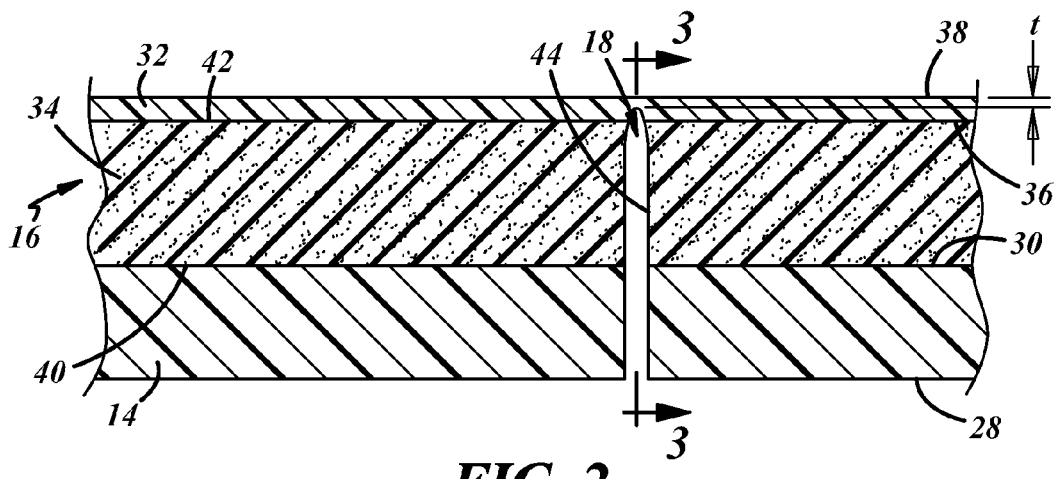
FIG. 2 is an enlarged cross-sectional view of a portion of the instrument panel of FIG. 1 showing a covering and the tear seam.

FIG. 2 is a partial cross-sectional view of the instrument panel of FIG. 1 showing substrate 14, covering 16, and tear seam 18. Substrate 14 is the base component of instrument panel 10 to which other components may be attached and/or extend from for functional or aesthetic purposes and includes inner and outer surfaces 28 and 30. The thickness of the substrate generally ranges from 2.0 mm to 4.0 mm for polymer-based materials such as filled or unfilled thermoplastic materials. Examples of suitable materials include polyolefin-based materials, like polypropylene or thermoplastic olefins (TPOs), or other thermoplastics such as ABS, ABS/PC, nylon, etc. Suitable substrate filler materials include short or long glass fibers or mineral-based fillers. Polypropylene having filler material including long glass fibers in an amount of 20-30% by weight is one example of a suitable substrate material, but other polymeric or non-polymeric materials or composites may be used.

Covering 16 overlies substrate 14 and may be provided for decorative purposes. In the particular embodiment of FIG. 2, covering 16 is a multi-layer covering that includes a skin layer 32 and a foam layer 34. Foam layer 34 may be constructed from a foam layer material that includes a polymer-based foam and one or more additives, as will be described in greater detail below, though additional layers of foam or non-foam material may be included with or without additives. Skin layer 32 is generally decorative and includes inner surface 36 and opposite outer surface 38, where outer surface 38 is also the visible outer surface of the covering 16. Skin layer 32 may be constructed from relatively pliable materials such as TPOs, thermoplastic elastomers (TPEs), polyvinylchloride (PVC), thermoplastic polyurethanes (PURs), leather, simulated leather, or other types. Material selection may be based on a number of factors, including the desired type of texture, the tactile feeling of the material, cost, processability, or other factors. Olefin-based materials such as TPOs or other polymers based on ethylene, propylene, butylene, or butadiene or blends, alloys, or copolymers thereof may be preferred due to their low cost, low density, and wide available ranges of properties. The thickness of skin layer 32 may range from about 0.2 mm to about 1.0 mm, and preferably ranges from about 0.3 mm to about 0.7 mm. Certain combinations of skin layer material type and thickness, such as relatively thin TPO skin layers, may be advantageous to provide a tactile feel that simulates the feel of more expensive materials such as leather.

Foam layer 34 is a layer located between the substrate 14 and the skin layer 32, and may be attached to one or both. In the illustrated embodiment, foam layer 34 includes inner and outer surfaces 40, 42 in facial contact with the outer surface 30 of the substrate 14 and the inner surface 36 of the skin layer 32, respectively. Foam layer 34 may be included to provide a softer or more cushion-like feel to the covering 16 and to the overall instrument panel than would be provided if the skin layer was in direct contact with the substrate 14, which may be more rigid. Foam layer 34 may also help level uneven areas in the underlying substrate, conceal substrate features, and provide more structure to skin layers that may otherwise be too thin and/or flexible to be practically handled in a manufacturing environment. Foam layer 34 can be constructed from one or more compressible but resilient foam layer materials, such as polyolefin-based (e.g., PP or TPO) foam, polyurethane foam, acrylic-based foam, or polyester foam, to name a few. Some of these materials may be cross-linked for additional resilience and may include open- or closed-cell structures. Skin and foam layers 32, 34 may be separately disposed over substrate 14, or they may be attached together by adhesive bonding, lamination, melt bonding, or other methods. Some types of foam layers can be formed in place between the substrate 14 and skin layer 32.

Different skin and foam layer thicknesses can be combined to form coverings having thicknesses ranging anywhere from about 0.2 mm (where the foam layer is omitted) up to about 6.0 mm or more. For example, a skin layer 32 ranging in thickness from about 0.4 mm to about 0.6 mm may be attached to a foam layer 34 ranging from about 3.5 mm to about 4.5 mm to form a covering 16 having a thickness ranging from about 3.9 mm to about 5.1 mm. Of course, this is but one example, as the number of combinations of layer thicknesses is unlimited. An all-olefin instrument panel may be provided by selecting olefin-based materials for the substrate 14, the skin layer 32, and the foam layer 34, which may be advantageous for vehicle end-of-life material recycling.

Tear seam 18 may include any of various types of cuts, scores, notches, or other types of stress concentrators that are formed in one or more layers of the panel 10 to at least partially define the location of the airbag deployment opening when the airbag inflates. In the embodiment shown in FIGS. 2 and 3, tear seam 18 includes a plurality of cuts 44 extending at least partially into the covering 16 from inner surface 40. In particular, each of the cuts 44 shown in the figures extends through the foam layer 34 and partially into skin layer 32. The particular geometry of cuts 44 shown in the figures, generally columnar or cylindrical with pointed or slightly rounded ends, may be formed by laser cutting or scoring, in which case they may be referred to as laser cuts. Each cut 44 may be formed a distance D from the next or nearest cut along the tear seam 18, and D may be constant or variable from one cut spacing to another. Distance D may range from about 0.5 mm to about 5.0 mm, depending on the types of materials used in the construction of covering 16 and/or on other factors. In one embodiment, D is about 3.0 mm on average or ranges from about 2.0 to 4.0 mm. Lower values for D are sometimes preferable for better tear seam function. However, in some cases, if D is too small, a read-through phenomenon can occur that makes the tear seam location at least partly visible when the outer surface 38 of the covering 16 is viewed and may be considered a visual defect. Of course, the illustrated tear seam 18 is only an example, as any other tear seam configuration formed in any one or more of the panel layers may be used in conjunction with the teachings presented herein.

Figure 3:
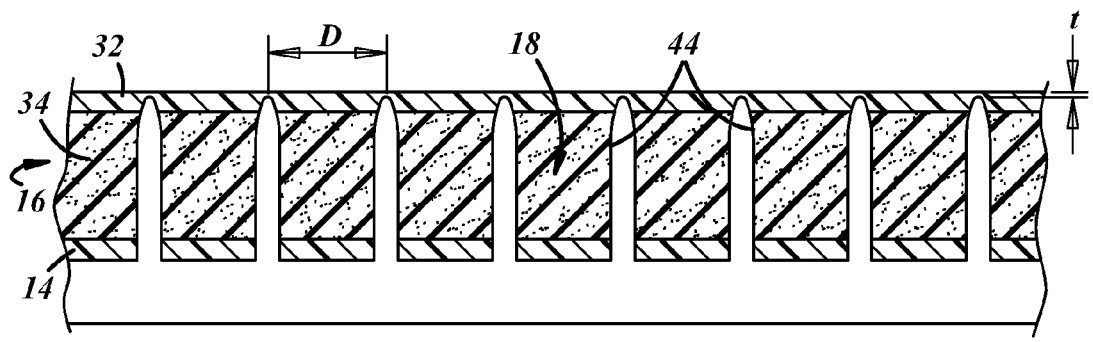
FIG. 3 is a cross-sectional view along the tear seam of FIG. 2 showing a plurality of cuts arranged along the tear seam.

The depth of each cut 44 partly defines a residual wall thickness (RWT) at each cut location, shown as t in FIGS. 2 and 3. Here, the RWT includes only a portion of skin layer 32 at each cut. In particular, t at each cut location is the distance between the rounded or pointed end of each laser cut and the outer surface 38 of the skin layer 32. In other embodiments, one or more cuts may be associated with a RWT that includes both the thickness of the skin layer 32 and at least a portion of the foam layer 34 (e.g., each of cuts 44 can extend into the covering 16 different amounts independently from one another). While shown formed generally perpendicular to the various panel layer surfaces, one or more of the cuts 44, or an entire continuous tear seam cut in the shape of the desired deployment opening, may be formed at any angle with surfaces of the various layers. The type of tear seam 18 shown in FIGS. 2 and 3 may behave like perforations during airbag deployment such that the covering 16 tears along the minimum RWT locations to form the deployment opening when the underlying airbag inflates.

RWT values may range from about 0.1 mm to about 0.5 mm, depending on the types of materials used in the covering 16 and/or on other factors. As with distance D, lower RWT values are sometimes preferable for better tear seam function, but if the RWT is too small, a similar read-through phenomenon can occur. Additionally, as RWT values approach a lower limit or read-through threshold (i.e., a value below which read-through is likely to occur), cut depth accuracy and consistency may become more critical. For example, if the RWT read-through threshold for a certain covering construction is about 0.15 mm, the closer the average RWT value is to 0.15 mm, the less margin of error there is for the depth of each cut; whereas, setting the RWT value at 0.4 mm, for example, allows for a greater margin of error in the cut depth for the same covering without allowing RWT values to fall below the threshold value. It has been found that constructing foam layer 34 from a foam layer material that includes a polymer-based foam and one or more additives that affect the light transmission properties of the material may contribute to a desirable ability to produce coverings having lower average RWT values by improving the consistency of laser cut depth along the tear seam, while also avoiding read-through problems.

Foam layer 34 may be formed from a foam layer material that includes a polymer-based foam and at least one additive that can alter the light transmission properties of the polymer-based foam. The polymer-based foam includes a solid polymer portion with voids, gas bubbles, or other gas-filled regions dispersed within the polymer portion. The polymer portion can include any polymer, copolymer, or any mixture thereof and may or may not be at least partially cross-linked as used in the foam layer 34. Consistent with the above-description, the polymer portion can include polyolefin (e.g., polypropylene, polyethylene, etc.), polyurethane, or other polymers. The voids or gas-filled areas of the polymer-based foam impart the foam with a cellular structure, as is known with foam materials. An open-cell foam includes voids that are typically air-filled and at least partially interconnected throughout the material, while a closed-cell foam includes voids or gas bubbles that are generally not interconnected throughout the material. The ratio of void volume to solid polymer portion within the polymer-based foam partly determines the foam density. The polymer-based foam has certain characteristics and/or material properties associated with it that depend on its composition and density, among other things. Polymer-based foam materials for use in foam layers of airbag coverings are typically produced in the natural color of the polymer portion because the material is not visible when assembled as part of a panel assembly.

The additive included in the foam layer material may be selected as a type and in an amount that alters at least one light transmission property of the polymer-based foam. For example, the additive may be selected and included in an amount that reduces the amount of light transmitted through the foam layer material at a characteristic wavelength when compared to the polymer based-foam. As used herein, "when compared to the polymer-based foam" refers to the polymer-based foam without the additive that is included in the foam layer material, although this does not mean that the polymer-based foam is necessarily free of other additives. In one embodiment, the additive is a colorant that is present in an amount that alters the visible color of the material so that it is different from the natural color of the polymer portion of the material. The color of the foam layer material can affect its light transmission properties. For example, including a colorant in the foam layer material that imparts the material with a color such as black or some other dark color that absorbs light across a relatively broad portion of the electromagnetic spectrum can decrease the transmission of light through the foam layer material when compared to the polymer-based foam. Carbon black may be a suitable colorant that can be included in an amount that decreases the transmission of light through the foam layer material when compared to the polymer-based material. Other black colorants may also be suitable, such as graphite, other forms of elemental carbon, or other non-elemental pigments, for example. Black or other dark colorants are thought to decrease light transmission through the foam layer material at least by increasing the absorption of light at the characteristic wavelength as it passes through the material. In fact, any additive may be included in the foam layer material that increases its absorption of light at the characteristic wavelength passing therethrough when compared to the polymer-based foam, whether or not the visible color of the polymer-based foam is changed due to the additive. For example, the characteristic wavelength may not be within the visible portion of the electromagnetic spectrum, such as is the case with ultraviolet and infrared light.

FIGS. 4 and 5 illustrate the effect of such an additive schematically. FIG. 4 shows an illustrative polymer-based foam 50. A source of light energy 60 is shown directing an amount of energy E toward polymer-based foam 50. When the light energy E encounters the polymer-based foam 50, the energy E may be divided into at least three parts, including reflected energy $E_r$, absorbed energy $E_a$, and transmitted energy $E_t$ so that $$E=E_r+E_a+E_t.$$

FIG. 5 shows an embodiment of a foam layer material 50' that includes the polymer-based foam 50 of FIG. 4 and an additive in an amount sufficient to decrease the amount of light transmission through the material 50' when compared to the polymer-based foam 50. When light energy E encounters the foam layer material 50', the energy E is also divided into three corresponding parts so that $$E=E_r'+E_a'+E_t',$$

where $E_a'>E_a$, $E_t'<E_t$, and $E_r'<E_r$. In this example, the decrease in light transmission through material 50' when compared to polymer-based foam 50 is due to a corresponding increase in light absorption in foam layer material 50'. This increase may be attributed to the above-described additive. In this case, the increased energy absorption also results in a decrease in energy reflection by the foam layer material 50' when compared to polymer-based foam 50. These figures are demonstrative only with the relative changes in light energy distribution not shown to any scale. The figures are also simplified to show absorption, transmission, and reflection only in the vertical direction and do not take into account the complexities of internal energy absorption and reflection within the bulk material.

In another embodiment, light transmission through the foam layer material may be affected by selecting an additive that increases the reflection of light by the foam layer material when compared to the polymer-based material. For example, a particular color of additive (e.g., certain white titanium dioxide-based colorants) may be selected for inclusion in the foam layer material that reflects the characteristic wavelength of light. In fact, any additive may be included in the foam layer material that increases the reflectivity of the material at the characteristic wavelength when compared to the polymer-based foam, whether or not the color of the material is changed due to the additive. For example, certain particulate additives known to reflect the characteristic wavelength could be used in the foam layer material. This embodiment is shown schematically in FIG. 6 with illustrative material 50" exhibiting an increase in reflected energy $E_r''$ when compared to polymer-based foam 50 of FIG. 4. In other embodiments, both modes of reducing light transmission through the material may be employed by including an additive that increases light absorption and an additive that increases light reflectivity, or by including an additive that does both. Yet other embodiments may include one or more additives that result in an increase in light absorption without significantly affecting light reflection, or in an increase in light reflection without significantly affecting light absorption. In any case, the light transmission through the foam layer material is reduced by inclusion of the additive at least partially through an increase in either the amount of light absorbed or the amount of light reflected at the characteristic wavelength when compared to the polymer-based material.

In order to better describe the manner in which reducing the transmission of light through the foam layer material may improve laser scoring processes, an example of a laser scoring process will now be described. Referring to FIG. 7, a schematic of a laser scoring process for use in forming a tear seam 18 in one or more airbag panel components is shown, according to one embodiment. The illustrated process uses a laser scoring system 100 that includes a laser light source 102, a sensor 104, and a feedback loop 106, along with means for indexing light source 102 and sensor 104 from one cut location to another. Indexing can include moving light source 102 and sensor 104 together in a direction along a cutting path or from one location to another along a cutting pattern (e.g., in the left-to-right direction indicated by the arrow in FIG. 7). Indexing can also include moving the covering 16 (shown in cross-section) and/or other panel component in an opposite direction, or it can include moving both the covering and the light source/sensor.

Light source 102 is positioned to direct a laser light beam 108 toward the desired panel component, in this case toward the inner surface of an embodiment of covering 16. In one embodiment, the light source 102 is directed toward a substrate (such as substrate 14 of FIGS. 1-3), but the substrate has been omitted in FIG. 7 for clarity. In such an embodiment, the laser beam 108 could be used to form a tear seam in the substrate material as well as the covering, or the substrate could include an airbag door gap through which beam 108 passes to reach covering 16. The light source 102 may be any type of laser light source, one example of which is a $CO_2$ laser source that can produce a narrowly focused light beam comprising light energy at a characteristic wavelength. $CO_2$ lasers typically produce light in the mid-infrared range of the electromagnetic spectrum having a wavelength of about 10.6 μm, but may be constructed to produce light having other wavelengths. Other light sources capable of cutting the provided covering materials may be used and may have different characteristic wavelengths that can be used to help select the additive for the foam layer material. As used herein, the characteristic wavelength refers to the nominal wavelength of a light beam but is not limited to a single wavelength. For example, the characteristic wavelength may be a range of wavelengths or a wavelength band normally associated with the particular light source.

Sensor 104 is arranged on an opposite side of the covering 16 from the light source 102, or on the same side as the skin layer 32 in this example. Sensor 104 is located within the projected path of beam 108 and is configured to receive and sense energy from the laser light source 102. This example of sensor 104 includes a light sensitive side 110 that faces toward the skin layer 32 to sense light at the characteristic wavelength (or range of wavelengths that includes the characteristic wavelength) emitted by light source 102. While FIG. 7 is not necessarily to scale, and the physical size of sensor 104 is not limited, sensor 104 is shown in one possible relative size relationship with respect to the distance D between successive laser cuts 44. For example, as already noted, distance D may range from about 0.5 mm to about 5.0 mm. In one embodiment, sensor 104 is about 25-35 mm in length (side-to-side as oriented in FIG. 7). Thus sensor 104, including its light sensitive side 110, may be physically large enough to span a plurality of tear seam cut locations. Sensor 104 in the illustrated embodiment also includes a center line 112 that generally remains in alignment with beam 108 during the scoring process, though it is not necessarily located in the center of the sensor 104.

To form a laser cut 44 in the covering that results in the desired RWT, source 102 is energized and directs beam 108 toward the covering 16 as shown. At some point during the formation of an individual cut 44, the beam 108 extends into covering 16 to a distance sufficient to cause the transmission of light through the covering 16 to be greater than zero. Sensor 104 detects the intensity or amount of light transmitted through the remaining thickness of covering 16 while each cut 44 is being formed and communicates that information within system 100 via feedback loop 106, which may include one or more processors (not shown) that control system 100 operation. System 100 is automated and may be configured to stop cutting or de-energize the laser light source 102 at a particular cut location when sensor 104 detects a pre-determined amount of light being transmitted from source 102 and through the remaining thickness of the covering 16. The pre-determined amount of light that results in the desired RWT for a particular covering or panel assembly may be determined experimentally and represented in system 100 as a user-set cut-off voltage. The cut-off voltage is one type of setting that informs system 100 at what sensor output voltage (correlated to the amount of light sensed) it should stop cutting at one cut location and move to the next cut location along the cutting path.

In some instances during use of a laser scoring system such as system 100, an energy leakage phenomenon can occur. For example and with reference to FIG. 7, while a laser cut is being formed at a particular location, such as location B, in the covering 16, some amount of laser light energy may be transmitted through the foam layer material in a direction having a horizontal component. Some of this light may reach a previously formed laser cut at a different nearby location, such as location A, and be transmitted through the RWT at the previously formed cut and toward the sensor 104. While laser light beam 108 may generally have a very narrow and controlled size as directed at the panel components, as it passes through the covering materials, internal reflection of the light energy can contribute to this energy leakage phenomenon, particularly within the foam layer 34 where the material has a cellular structure that may promote light reflection in multiple random directions. This energy leakage and subsequent emission of light toward sensor 104 from locations along the covering that have already been cut can cause the sensor to prematurely reach the user-set cut-off voltage. In other words, the extraneous light detected by sensor 104 may lead system 100 to believe that the desired cut depth and RWT at the present cut location (location B in the example) has been reached, when in reality the present cut has not yet been fully formed. In extreme cases, an entire cut will be omitted because the moment the laser light source 102 is powered on to form a new cut, immediate energy leakage toward a previously formed cut causes the sensor 104 to reach its cut-off voltage, and the system 100 indexes to the next cut location accordingly.

Including an additive as described above in the foam layer material can help to lessen or eliminate the energy leakage phenomenon as described in one embodiment of a method of forming a tear seam. With reference to FIG. 7, the method may include the step of providing an airbag covering 16 including a skin layer 32 and a foam layer 34, where the layers have surfaces in facial contact with each other, and directing a laser light beam 108 from a laser light source 102 and toward the covering 16 such that the foam layer 34 is located between the light source 102 and the skin layer 32. The method may further include successively forming a plurality of laser cuts 44 in the covering 16 at a plurality of spaced apart locations, such as locations A and B, along a pre-determined cutting pattern that corresponds to a desired tear seam location. Additionally, the method includes limiting the amount of energy leakage from the location of each successive cut (e.g., location B) to the location of the previously formed cut (e.g., location A) while forming each successive cut by providing an additive in the foam layer 34 that affects the energy transmission characteristics of the foam layer 34. The energy transmission characteristics of the foam layer may be of particular interest at the characteristic wavelength of the laser light beam. Various embodiments of the method include steps of selecting the additive based on one or more of the criteria explained above.

In one embodiment, the additive may be included in the foam layer material by adding it to the polymer portion of the polymer-based foam material to arrive at the additive-containing foam layer material. For example, the additive may be melt processed with the polymer portion of the material prior to foaming the material or, in cases where the foam material is a reaction product, the colorant or other additive may be dispersed within one component of a multi-component reaction system. The amount of additive included in the foam layer material is an amount sufficient to decrease the amount of light transmission through the material at the characteristic wavelength when compared to the polymer-based foam. In one embodiment, the amount of additive is an amount that is sufficiently low so that it does not substantially alter at least one of the following properties of the polymer-based foam: the density, the stiffness (modulus of elasticity), the compressive stiffness, or the percentage of material elongation at break. In another embodiment, the additive is present in an amount that increases the laser cutting rate of the material at a particular laser power and duty cycle when compared to the polymer-based foam. In other words, the additive is present in an amount that causes the depth or distance a laser cut extends into the foam layer material to be higher per unit of applied laser light energy than for the polymer-based foam without the same additive.

FIG. 8 summarizes experimental data collected during laser scoring of one embodiment of an airbag covering in which the foam layer material includes a black colorant. The colorant was present in an amount that increased the cutting rate of the foam layer material 50' when compared to the polymer-based foam 50 in its natural color. The same amount of laser light energy was directed at the foam layer of the coverings in a statistically significant number of locations, and the depth of each laser cut was measured. The cut depths were averaged for each material 50 and 50' and normalized for purposes of FIG. 8, where it is shown that laser cut depth was 55% greater per unit energy for the foam layer material 50' having the additive than for the natural color polymer-based foam 50. This is believed to be a manifestation of the increased energy absorption at the characteristic wavelength due to the additive. In other words, more of the applied laser light energy was used to cut the foam material rather than being otherwise directed away from the cut location, such as toward a previously formed cut.

FIG. 9 shows one possible result of including a light transmission-affecting additive in the foam material layer. In the chart of FIG. 9, the horizontal axis generally represents the light sensitive side or surface 110 of the sensor 104 from FIG. 7. The vertical axis generally represents the amount or intensity of light detected by the sensor. The vertical axis is positioned at the center line 112 of the sensor, described earlier in conjunction with FIG. 7. The chart shows a theoretical and approximate distribution of light energy that may reach the sensor while laser scoring a covering with a natural color polymer-based foam 50 and a covering with a foam layer material 50', 50" having an additive that reduces light transmission at the characteristic wavelength. The area under each curve may generally represent the total amount of light energy received by the sensor at a particular depth of cut for each material. As shown, the total amount of light received by the sensor may be less for the foam layer material having the additive, and the distribution of light received by the sensor may be narrower. Thus, a larger portion of the light reaching the sensor is attributed to the laser cut actually being formed rather than being attributed to energy leakage within the foam layer, allowing for more accurate and repeatable monitoring of cut depth. Accordingly, one embodiment of the method of forming a tear seam includes limiting the energy leakage from one cut location to another cut location and narrowing the distribution of light that is received by the sensor and/or transmitted through the covering while a laser cut is being formed.

Experimental data has shown a corresponding increase in the consistency of RWT values associated with laser cuts formed along a tear seam. For example, when laser scoring a covering having a foam material layer that includes a black colorant as an additive, the standard deviation of the distribution of RWT values along the tear seam is less than the standard deviation similarly obtained when laser scoring a natural color polymer-based foam. Including one or more additives in the material of the foam layer of an airbag covering may offer additional advantages as well. As already mentioned, increasing the amount of energy absorbed by the material may include the benefit of higher laser cutting rates, which can improve cycle times or lower laser power requirements. Distance D (as shown in FIGS. 3 and 7) between cut locations may be decreased in some cases, since limiting the energy leakage between cut locations during cut formation means that a previously formed laser cut can be arranged closer to the cut being formed with a reduced likelihood that the closer arrangement will increase errant light detected by the laser light sensor during the scoring process.

In addition, certain vehicle interior applications may benefit from additives that result in a foam color that is darker than natural. For example, in some vehicle interior applications, covering materials may be sewn together or sewn to other components to provide a particular aesthetic. During sewing or other processes that form holes or apertures in the covering material, it is possible that material from the foam layer of the covering may become visible through the formed holes, or that small pieces of the foam layer material may be pulled through the covering from the foam layer side to the visible skin layer side by the needle and thread. Where dark-colored skin layer materials are utilized in such applications, additives that result in a dark-colored foam layer can help make any stray foam layer material pieces less visible to vehicle occupants.

In embodiments that employ an additive that imparts the foam layer material with reflective characteristics at the characteristic wavelength, the cutting rate of the material may be decreased when compared to the polymer-based material. While this could increase laser cutting cycle times, it could also increase the precision and repeatability of the cut depth because each applied amount of laser energy removes less material. Though it may seem somewhat counterintuitive to formulate the foam layer material to reflect light that is meant to form laser cuts in the material, such a formulation provides at least one of the same advantages as a foam layer material that is formulated to absorb more of the laser light. Each embodiment helps to confine the laser light to the particular cut location and limits the energy leakage through the material and to other locations along the covering. Skilled artisans reviewing the teachings presented herein will now also appreciate the dependence of the light absorption characteristics of the foam layer material on the characteristic wavelength. For example, a white titanium dioxide-based colorant may be an effective additive to increase absorption of light at a characteristic wavelength in the ultraviolet portion of the spectrum or to increase reflection of light at a characteristic wavelength in the visible or infrared portion of the spectrum.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of forming a tear seam in an airbag covering, comprising the steps of:
    (a) providing an airbag covering including a skin layer and a foam layer, the layers having surfaces in facial contact with each other;
    (b) directing a laser light beam from a laser light source toward the covering such that the foam layer is located between the light source and the skin layer;
    (c) successively forming a plurality of laser cuts in the covering at a plurality of spaced apart locations along a pre-determined cutting pattern that corresponds to a desired tear seam location; and
    (d) limiting the amount of energy leakage from the location of each successive laser cut to the location of previously formed laser cuts while forming each successive laser cut by providing an additive in the foam layer that affects the energy transmission characteristics of the foam layer.

2. The method of claim 1, further comprising the steps of:
    providing the foam layer such that it is constructed from a foam layer material that includes a polymer portion having a natural color associated with the polymer portion; and
    providing the additive in the form of a colorant dispersed in the polymer portion of the material in an amount that causes the color of the foam layer material to be different from the natural color.

3. The method of claim 1, further comprising the steps of:
    providing the foam layer such that it is constructed from a foam layer material comprising a polymer-based foam and the additive; and
    selecting the additive such that less light is transmitted through the foam layer material than through the polymer-based foam at a characteristic wavelength of the laser light beam.

4. The method of claim 3, wherein the step of selecting the additive further comprises the step of:
    selecting the additive such that more light is absorbed by the foam layer material than by the polymer-based foam at the characteristic wavelength.

5. The method of claim 3, wherein the step of selecting the additive further comprises the step of:
    selecting the additive such that more light is reflected by the foam layer material than by the polymer-based foam at the characteristic wavelength.

6. The method of claim 3, wherein the step of selecting the additive further comprises the step of:
    selecting the additive such that the depth of each laser cut per unit energy of light is higher for the foam layer material than for the polymer-based foam.

7. The method of claim 1, further comprising the step of:
    disposing the covering provided in step (a) over a substrate so that the foam layer is between the substrate and the skin layer before step (b).

8. The method of claim 1, wherein the distance between at least some of the laser cut locations along the cutting pattern is about 3.0 mm or less.

9. The method of claim 1, wherein step (d) further comprises:
    limiting a width of the distribution of light transmitted through the covering at the characteristic wavelength and toward a laser scoring system sensor by providing the additive.

10. An airbag covering for use in a tear seam forming process that uses a laser light beam having a characteristic wavelength, the covering comprising:
    a skin layer having a decorative outer surface and an opposite inner surface; and
    a foam layer bonded to the inner surface of the skin layer, the foam layer being formed from a foam layer material that includes a polymer-based foam and an additive dispersed within the foam layer material, the additive being present in an amount that decreases the transmission of the characteristic wavelength of light through the foam layer material and increases a cutting rate of the foam layer material when compared to the polymer-based foam, the cutting rate being the depth of a laser cut per unit of laser light energy applied to the material.

11. An airbag covering as defined in claim 10, wherein the additive includes carbon black or other colorant.

12. An airbag covering as defined in claim 10, wherein the additive is present in an amount that decreases the transmission of the characteristic wavelength of light through the foam layer material and increases the absorption of the characteristic wavelength of light by the foam layer material when compared to the polymer-based foam.

13. An instrument panel, comprising the airbag covering of claim 10 disposed over a substrate so that the foam layer is interposed between the substrate and the skin layer, the covering further comprising a tear seam that at least partially defines an airbag deployment opening when an airbag located under the substrate deploys.

14. An instrument panel, comprising a substrate and an airbag covering for use in a tear seam forming process that uses a laser light beam having a characteristic wavelength, the covering comprising:
    a skin layer having a decorative outer surface and an opposite inner surface; and
    a foam layer bonded to the inner surface of the skin layer, the foam layer being formed from a foam layer material that includes a polymer-based foam and an additive dispersed within the foam layer material, the additive being present in an amount that decreases the transmission of the characteristic wavelength of light through the foam layer material when compared to the polymer-based foam,
    wherein the airbag covering is disposed over the substrate so that the foam layer is interposed between the substrate and the skin layer, the covering further comprising a tear seam that at least partially defines an airbag deployment opening when an airbag located under the substrate deploys.

15. An instrument panel as defined in claim 14, wherein the additive includes carbon black or other colorant.

16. An instrument panel as defined in claim 14, wherein the additive is present in an amount that decreases the transmission of the characteristic wavelength of light through the foam layer material and increases the absorption of the characteristic wavelength of light by the foam layer material when compared to the polymer-based foam.

17. An instrument panel as defined in claim 14, wherein the additive is present in an amount that decreases the transmission of the characteristic wavelength of light through the foam layer material and increases the reflection of the characteristic wavelength of light by the foam layer material when compared to the polymer-based foam.

* * * * *